United States Patent
Badr et al.

(10) Patent No.: US 12,079,292 B1
(45) Date of Patent: Sep. 3, 2024

(54) PROACTIVE QUERY AND CONTENT SUGGESTION WITH GENERATIVE MODEL GENERATED QUESTION AND ANSWER

(71) Applicant: Google LLC, Mountain View, CA (US)

(72) Inventors: Ibrahim Badr, New York, NY (US); Yunsong Guo, Santa Clara, CA (US); Imran R. Mansuri, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/486,696

(22) Filed: Oct. 13, 2023

Related U.S. Application Data

(60) Provisional application No. 63/584,015, filed on Sep. 20, 2023.

(51) Int. Cl.
*G06F 16/9535* (2019.01)
*G06F 40/20* (2020.01)

(52) U.S. Cl.
CPC .......... *G06F 16/9535* (2019.01); *G06F 40/20* (2020.01)

(58) Field of Classification Search
CPC ............ G06F 16/9535; G06F 16/9536; G06F 16/9538; G06F 16/951; G06F 16/953; G06F 16/9532; G06F 40/20
See application file for complete search history.

(56) References Cited

U.S. PATENT DOCUMENTS

| | | | |
|---|---|---|---|
| 9,767,198 B2 * | 9/2017 | Ghanekar | G06F 16/345 |
| 10,846,331 B2 * | 11/2020 | Ip | G06F 16/686 |
| 11,288,319 B1 * | 3/2022 | Das | G06F 40/186 |
| 2010/0082649 A1 * | 4/2010 | Gutt | G06F 16/951 707/E17.014 |
| 2011/0184951 A1 * | 7/2011 | Paparizos | G06F 16/951 707/E17.089 |
| 2012/0246165 A1 * | 9/2012 | Batraski | G06Q 30/0277 707/E17.046 |
| 2016/0012104 A1 * | 1/2016 | Petrov | G06F 16/951 707/706 |
| 2017/0206250 A1 * | 7/2017 | Loomans | G06Q 50/01 |
| 2018/0060340 A1 * | 3/2018 | Hazra | G06F 16/90324 |
| 2018/0203863 A1 * | 7/2018 | Hansson | G06F 16/3322 |
| 2018/0232644 A1 * | 8/2018 | Acharya | G06N 5/043 |
| 2022/0188661 A1 * | 6/2022 | Tappin | G06F 16/248 |
| 2022/0215029 A1 * | 7/2022 | Balikas | G06F 40/20 |

\* cited by examiner

*Primary Examiner* — Kris E Mackes
(74) *Attorney, Agent, or Firm* — DORITY & MANNING P.A.

(57) ABSTRACT

Systems and methods for proactive query and content suggestion can include obtaining web data, determining a change event occurred, and generating a query and content suggestion. Generating the query and content suggestion can include processing data descriptive of the change event with a generative model to generate one or more model-generated query suggestions. One or more web resources can be obtained then processed to generate a change event summary. The one or more query suggestions and the change event summary can then be provided for display.

18 Claims, 11 Drawing Sheets

700

702 — OBTAIN A PLURALITY OF QUERIES

704 — PROCESS THE PLURALITY OF QUERIES TO DETERMINE A QUERY TREND

706 — PROCESS DATA DESCRIPTIVE OF THE QUERY TREND WITH A LANGUAGE MODEL TO GENERATE ONE OR MORE QUERY SUGGESTIONS

708 — OBTAIN ONE OR MORE WEB RESOURCES RESPONSIVE TO THE ONE OR MORE QUERY SUGGESTIONS

710 — PROCESS THE ONE OR MORE WEB RESOURCES WITH THE LANGUAGE MODEL TO GENERATE A CONTENT SUMMARY

712 — PROVIDE THE ONE OR MORE QUERY SUGGESTIONS AND THE CONTENT SUMMARY FOR DISPLAY

FIGURE 7

PROACTIVE QUERY AND CONTENT SUGGESTION WITH GENERATIVE MODEL GENERATED QUESTION AND ANSWER

RELATED APPLICATIONS

This application claims priority to and the benefit of U.S. Provisional Patent Application No. 63/584,015, filed Sep. 20, 2023. U.S. Provisional Patent Application No. 63/584,015 is hereby incorporated by reference in its entirety.

FIELD

The present disclosure relates generally to proactive query and content suggestion. More particularly, the present disclosure relates to determining an event has occurred, generating a suggested query with a generative language model, determining suggested content, and providing the query and content suggestion.

BACKGROUND

Staying up to date on changes and general news related to global and/or interest-specific changes can be difficult. Moreover, the understanding of when to seek out information and what information to look for can be non-intuitive as new information is added to the web constantly. In addition, the content being requested by the user may not be readily available to the user based on the user not knowing where to search, based on the storage location of the content, and/or based on the content being difficult to understand.

Existing techniques for query suggestions can be stale as the suggestions may be mere reiterations of past queries or associated with last viewed content. Techniques that provide trend based suggestions may fail to provide tailored suggestions and the suggested query may lead to an inundation of results that are to be navigated to and reviewed to determine why the topic is trending.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for proactive query and content suggestion. The method can include obtaining, by a computing system including one or more processors, web data. The web data can be descriptive of one or more topics. The method can include processing, by the computing system, the web data to determine a change event occurred. The change event can include an update associated with the one or more topics. The method can include processing, by the computing system, data descriptive of the change event with a generative model to generate one or more query suggestions. The method can include obtaining, by the computing system, one or more web resources associated with the change event. The method can include processing, by the computing system, the one or more web resources with the generative model to generate a change event summary and providing, by the computing system, the one or more query suggestions and the change event summary for display.

In some implementations, the method can include obtaining, by the computing system, user data associated with a user and determining, by the computing system, the user is interested in one or more particular topics based on the user data. Processing, by the computing system, the data descriptive of the change event with the generative model to generate the one or more query suggestions can be performed in response to determining, by the computing system, the change event is associated with the one or more particular topics.

In some implementations, the method can include determining, by the computing system, a second change event occurred. The second change event can include an update associated with one or more second topics. The method can include processing, by the computing system, data descriptive of the second change event with the generative model to generate one or more second query suggestions. The method can include obtaining, by the computing system, one or more second web resources associated with the second change event and processing, by the computing system, the one or more second web resources with the generative model to generate a second change event summary. The method can include providing, by the computing system, the one or more second query suggestions and the second change event summary for display. The one or more query suggestions and the change event summary can be provided as a first pair. In some implementations, the one or more second query suggestions and the second change event summary can be provided as a second pair. The first pair and the second pair can be provided in a newsfeed interface.

In some implementations, the method can include receiving, by the computing system, a selection of at least one of the one or more query suggestions or the change event summary and providing, by the computing system, a search results interface for display. The search results interface can include a plurality of search results responsive to a search query associated with the one or more query suggestions. The plurality of search results can include the one or more web resources. In some implementations, the method can include receiving, by the computing system, a selection of at least one of the one or more query suggestions or the change event summary and providing, by the computing system, a model-generated content item for display. The model-generated content item can be generated with the generative model. The model-generated content item can include information associated with the change event, and the information can include details obtained from one or more databases formatted into a natural language article by the generative model. In some implementations, the web data can be obtained before a search query is received. The one or more query suggestions and the change event summary can be provided for display before a search query is received.

Another example aspect of the present disclosure is directed to a computing system for proactive query and content suggestion. The system can include one or more processors and one or more non-transitory computer-readable media that collectively store instructions that, when executed by the one or more processors, cause the computing system to perform operations. The operations can include obtaining a plurality of queries. The plurality of queries can be obtained from a plurality of users. The operations can include processing the plurality of queries to determine a query trend. In some implementations, the query trend can be descriptive of an increase in a quantity of queries associated with a particular topic. The operations can include processing data descriptive of the query trend with a language model to generate one or more query suggestions. The operations can include obtaining one or more web resources responsive to the one or more query suggestions and processing the one or more web resources with the language model to generate a content summary. The content summary can be descriptive of contents of the one or more web resources. The operations can include providing the one or more query suggestions and the content summary for display.

In some implementations, the one or more query suggestions can be generated to be in a question format. The content summary can be generated to be in an answer format, and the content summary can be generated to be responsive to a question of the one or more query suggestions. The content summary can include a natural language summary that includes one or more details obtained from the one or more web resources. In some implementations, processing the data descriptive of the query trend with the language model to generate the one or more query suggestions can be performed in response to: determining the particular topic is associated with one or more content items previously viewed by a particular user. The query trend can be a global query trend.

Another example aspect of the present disclosure is directed to one or more non-transitory computer-readable media that collectively store instructions that, when executed by one or more computing devices, cause the one or more computing devices to perform operations. The operations can include obtaining web data. The web data can be descriptive of content provided by a corpus of web resources. The operations can include processing the web data to determine a plurality of change events occurred. The plurality of change events can include a plurality of updates associated with a plurality of topics. The operations can include processing data descriptive of the plurality of change events with a language model to generate a plurality of query suggestions. The language model can include a generative model. In some implementations, each query suggestion can be associated with a respective change event of the plurality of change events. The operations can include obtaining a plurality of respective web resources associated with the plurality of change events. The plurality of respective web resources can include one or more respective web resources for each of the plurality of change events. The operations can include associating each of the plurality of query suggestions with a respective web resource of the plurality of respective web resources to generate a query suggestion web resource pair for each of the plurality of change events and providing a newsfeed interface for display. The newsfeed interface can include a set of query suggestion web resource pairs associated with at least a subset of the plurality of change events.

In some implementations, each change event of the plurality of change events can be determined based on determining an influx in articles associated with a respective topic. Each change event of the plurality of change events can be determined based on determining an influx in social media posts associated with a respective topic. The language model can include a machine-learned generative model trained to generate natural language data tailored to emulate a vocabulary, tone, and style of a particular user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a flow chart diagram of an example method to perform query trend determination and query suggestion according to example embodiments of the present disclosure.

Figure 1:
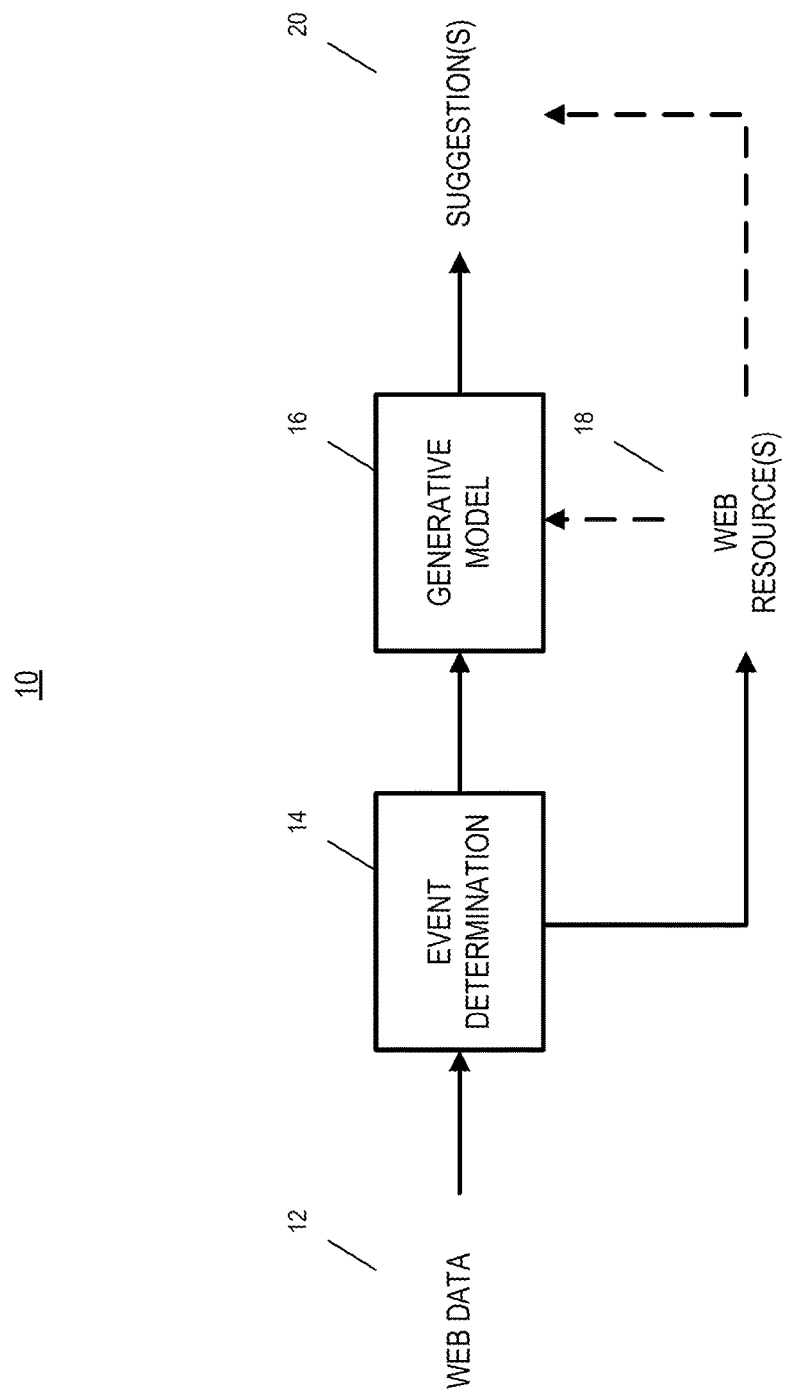
FIG. 1 depicts a block diagram of an example query suggestion system according to example embodiments of the present disclosure.

Reference numerals that are repeated across plural figures are intended to identify the same features in various implementations.

DETAILED DESCRIPTION

Generally, the present disclosure is directed to systems and methods for proactive query and content suggestion. In particular, the systems and methods disclosed herein can leverage change event determination and one or more generative models to generate timely, topical, and/or plain language query suggestions and/or content suggestions. Web data (e.g., data descriptive of search query logs, web traffic, web page updates, domain/web page generation, download rates, etc.) can be obtained and processed to determine a change in one or more topics has occurred (e.g., a company merger, a new comic book movie was announced, a particular player was traded, etc.). Data descriptive of the change event can be processed with a generative model (e.g., a large language model) to generate a query that can be suggested to a user. The query can be generated to be directed at obtaining search results associated with the particular aspect of the topic that has changed. The generative model can be trained to generate query suggestions that are formatted in natural language such that a user can easily understand the topic and direction of the query. The query and/or the data descriptive of the change event can then be utilized to obtain web resources (e.g., web pages, videos, images, audio clips, articles, books, and/or other data) associated with the change event (e.g., the particular aspect of the change event that has changed). In some implementations, the web resources can be processed with the generative model to generate a change event summary. The change event summary can summarize what has changed as outlined by the web resources. The change event summary can include a topic overview, an indicator of what has changed, and/or what effect that change has. The query with the web resource(s) and/or the change event summary can be provided to a user as a query suggestion with a preview of the answer to the question posed by the query.

Existing techniques for query suggestions can be stale as the suggestions may be mere reiterations of past queries (e.g., suggest a previously entered query) or associated with last viewed content (e.g., suggest a sub-topic associated with a previously viewed web page). Techniques that provide trend based suggestions may fail to provide tailored suggestions and the suggested query may lead to an inundation of results that are to be navigated to determine why the topic is trending. For example, not every trend may be pertinent to a user and/or the list of search results may not be easily comprehended, which can cause a user to perform tedious and time-consuming review of the search results list to understand the reason for the trend.

The systems and methods disclosed herein can proactively determine updates to topics that can then be processed to generate natural language query suggestions that can be provided with one or more exemplary results and/or a model-generated summary of the update. Global and/or user-specific trends and changes may be tracked based on query trends and/or based on recursively searching one or more databases. Once a trend and/or change is detected, a generative model can generate a suggested query (e.g., a suggested question) and may process a plurality of search results of the query to generate a summary that can be provided with the query suggestion.

The proactive determination can be performed before a search input is provided, which can direct a user to changes in one or more particular topics without the user having to have pre-existing knowledge of the change. Moreover, the query and content suggestions may be user tailored based on user preferences, determined user interests, user associations, and/or user style. For example, user data associated with the user can be processed to determine user interests, user groups (e.g., groupings of the user with one or more other users based on social networks, business networks, occupation, and/or other attributes), and/or historical interactions. The query and content suggestion can then be directed at specifically attempting to identify change events (and/or query trends) associated with topics that are pertinent to the user based on the determined user interests, user groups, and/or historical interactions. Additionally and/or alternatively, parameters of the generative model and/or a soft prompt can be trained to generate queries and/or summaries in the vocabulary, tone, and/or style.

The query and content suggestion can include generating natural language question and answer pairs. For example, the query suggestion can be formatted as a plain language question and can be comprehensive. The content summary can be formatted as an answer responsive to the question posed by the query suggestion. Proactive determination of question and answer suggestions can be generated by a generative model that can generate natural language questions and answer summaries for the determined change events.

Tracking trends and/or changes in topics can be utilized for proactively performing query suggestions in the form of natural language questions and answers, which can be implemented by search engines, news platforms, virtual assistants, and/or other applications and platforms to provide timely and digestible information to users. The generated suggestions can be provided as query suggestions and/or in a discover feed with a plurality of other generated questions and answers associated with a plurality of other trends and/or changes, such that a user has a feed of timely and plain language queries and content summaries to become more knowledgeable of changes in global topics and/or topics of interest to the user.

The generative model may process a plurality of queries to generate queries that encapsulate a query trend associated with a subset of the plurality of different queries. Alternatively and/or additionally, the generative model may process a query log for a particular user and/or a particular set of users to generate a query that predicts a search interest of the user based on learned sequence and predictive data of the generative model. The generative model may process headlines, uniform resource locators (URLs), and/or content items of articles or other web resources to determine the change event and generate a suggested query and/or a change event summary.

Prompting of the generative model may include rewriting logged queries to be more comprehensive, interesting, detailed, nuanced, fun, objective, informal or formal, serious or funny, and/or fitting one or more other preferences. The generative model may determine a query trend and/or a change event, process a plurality of queries and a plurality of web resources to generate a query that includes the direction of a subset of the queries associated with the trend and/or change and supplement the direction of the query with details from the web resources to have a detailed query suggestion that specifically identifies a point of interest of the suggested query and may include aspects of what changed and/or why there is a trend.

The systems and methods of the present disclosure provide a number of technical effects and benefits. As one example, the systems and methods can provide proactive query and content suggestions. The systems and methods can leverage event determination and a generative model to generate query and content suggestions that are both timely and easily digestible. In particular, a change associated with one or more topics can be determined. Data descriptive of the change can be processed with a generative model to generate one or more query suggestions. The one or more query suggestions and/or the data descriptive of the change can be utilized to identify and obtain one or more web resources associated with the change event. In some implementations, the one or more web resources can be processed with the generative model to generate a change event summary. The one or more query suggestions and the change event summary can then be provided to a user.

Another technical benefit of the systems and methods of the present disclosure is the ability to leverage a generative language model to generate a natural language question and answer format. The generative language model can be utilized to generate digestible information in the format of traditional dialogue. In some implementations, the generative language model and/or one or more soft prompts (e.g., a set of machine-learned parameters that can be processed with the input by the generative language model) can be trained to emulate the tone, style, and/or vocabulary of a particular user and/or a set of users to provide queries and/or summaries in terms, tone, styles, and/or dialects that a user traditionally uses.

Another example of technical effect and benefit relates to improved computational efficiency and improvements in the functioning of a computing system. For example, the systems and methods disclosed herein can leverage the generative model to provide natural language suggestions and summaries that can reduce the number of web pages accessed by a user in order to obtain knowledge on what and/or when an update on a topic has occurred. Additionally, the systems and methods can reduce the number of searches performed by the user for each knowledge inquiry. Moreover, in some implementations, the systems and methods may perform the event determination and/or the model-generated query and content generation via a server computing system, which can limit the data sent and/or received by the user computing system. With the reduction of web page visits, search instances, and system computations at the user computing system, the systems and methods can be utilized to provide directed and informative information to a user computing system with limited resources (e.g., limited computational resources (e.g., a smart device and/or mobile device) and/or limited network access (e.g., in a poor reception area)).

With reference now to the Figures, example embodiments of the present disclosure will be discussed in further detail.

FIG. 1 depicts a block diagram of an example query suggestion system 10 according to example embodiments of the present disclosure. In some implementations, the query suggestion system 10 is configured to receive, and/or obtain, a set of web data 12 descriptive of one or more topics and, as a result of receipt of the web data 12, generate, determine, and/or provide one or more suggestions 20 that can include one or more query suggestions and/or a change event summary. Thus, in some implementations, the query suggestion system 10 can include a generative model 16 that is operable to process data descriptive of the change event to generate a query suggestion expressed in plain language terms and syntax.

For example, web data 12 can be obtained from one or more computing systems (e.g., one or more server computing systems). The web data 12 can include web page edits, web page uploads, web traffic data, query usage by a plurality of users, and/or other web data. The web data can be periodically obtained, can be obtained in response to a user app usage instance, and/or continuously.

The web data 12 can be processed with an event determination block 14 to determine a change event occurred. The change event can be an update in one or more topics. The change event may be determined based on a query trend, a threshold number of resource updates associated with a topic, a web traffic increase above a threshold, and/or based on a threshold number of new content items associated with a topic. The thresholds may differ based on time, location, topic, generality of the topic, and/or one or more other contexts. The change event can be associated with an individual, an entity, a group of entities, a location, an object, and/or another topic.

Data descriptive of the change event can be processed with a generative model 16 to generate one or more query suggestions directed at surfacing search results related to the change event. The generative model 16 can include a machine-learned language model trained to generate natural language outputs. The one or more query suggestions may be formatted as a question. In some implementations, the one or more query suggestions may be in the tone, vocabulary, and/or style of the user by training the generative model (and/or a soft prompt) on dialogue of the user.

One or more web resources 18 can be obtained based on data descriptive of the change event and/or the one or more query suggestions. The one or more web resources 18 can be top search results and/or trusted content items from vetted databases. The one or more web resources 18 may be resources processed to determine the change event and/or web resources determined to corroborate the existence of the update and/or the details of the change event.

In some implementations, the one or more web resources 18 can be processed with the generative model 16 to generate a change event summary. The change event summary can be descriptive of details of the change event based on information in the one or more web resources 18. The change event summary can be a plain language summary and may be formatted as an answer posed by a question of the one or more query suggestions.

The one or more query suggestions and the one or more web resources may be presented as a search suggestion 20 to the user. Alternatively and/or additionally, the one or more query suggestions and the change event summary may be provided as a search suggestion 20. The one or more suggestions 20 can be generated and provided before a search input is received and may be updated based on any input received from the user.

Figure 2:
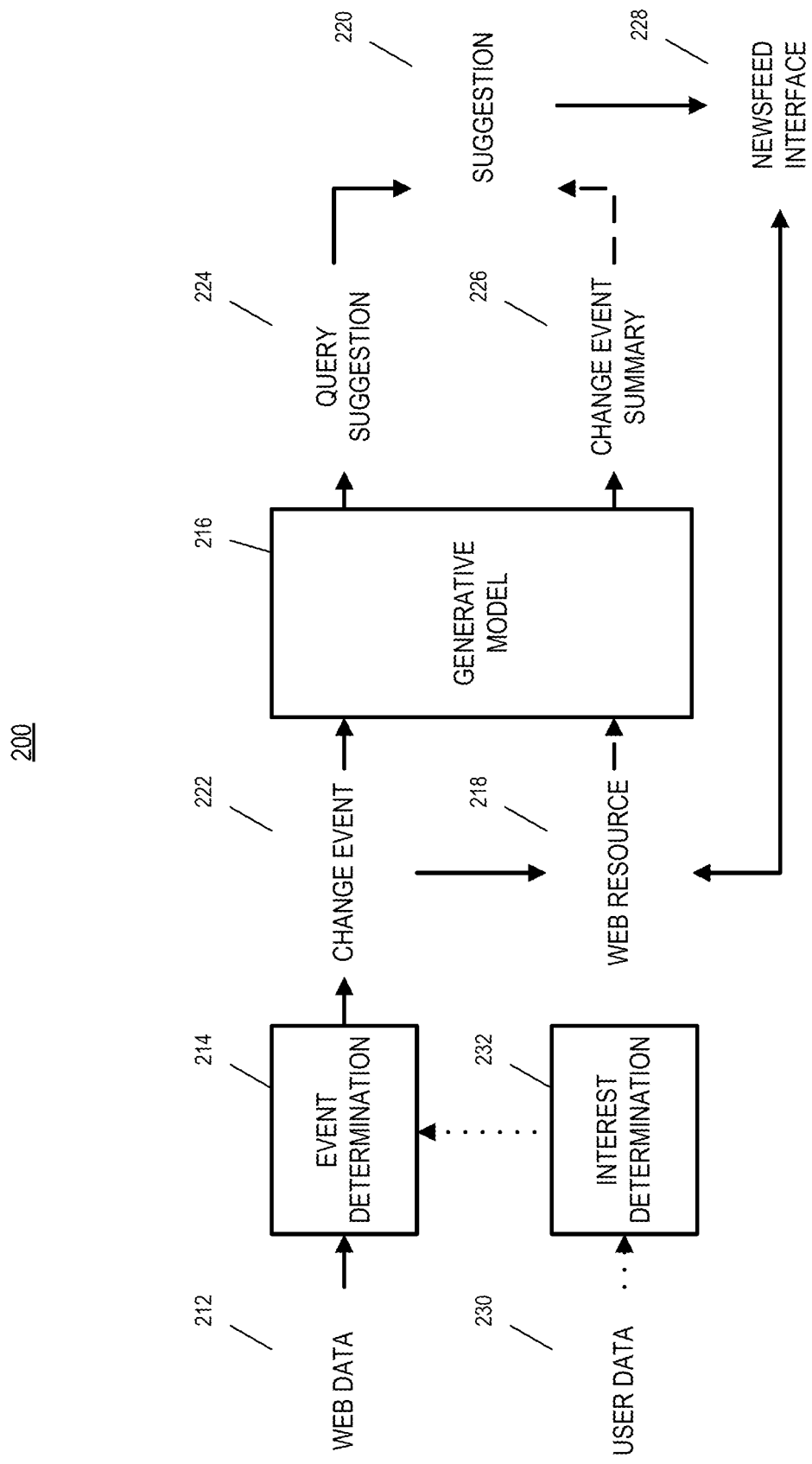
FIG. 2 depicts a block diagram of an example proactive query suggestion system according to example embodiments of the present disclosure.

FIG. 2 depicts a block diagram of an example proactive query suggestion system 200 according to example embodiments of the present disclosure. The proactive query suggestion system 200 is similar to query suggestion system 10 of FIG. 1 except that proactive query suggestion system 200 further includes an interest determination block 232 and/or a newsfeed interface 228.

For example, web data 212 can be obtained from one or more web platforms and/or one or more databases (e.g., one or more domains). The web data 212 can be obtained based on the particular user and/or may be general web data associated with global change tracking. The web data 212 can include web page edits, web page uploads, web traffic data, query usage by a plurality of users, and/or other web data. The web data 212 can be periodically obtained, can be obtained in response to a user app usage instance, and/or continuously.

The web data 212 can be processed with an event determination block 214 to determine a change event 222 occurred. Determining a change event occurred can be performed by one or more machine-learned models that may be trained to identify topic updates, web irregularities, and/or features descriptive of a change event 222. The change event 222 can be an update in one or more topics. The one or more topics can be associated with sports, politics, economics, entertainment, and/or other topics. The change event 222 may be determined based on a query trend, a threshold number of resource updates associated with a topic, a web traffic increase above a threshold, and/or based on a threshold number of new content items associated with a topic. The thresholds may differ based on time, location, topic, generality of the topic, and/or one or more other contexts. The change event 222 can be associated with an individual, an entity, a group of entities, a location, an object, and/or another topic.

In some implementations, the change event 222 determination can be tailored based on the particular user. For example, user data 230 associated with the particular user may be obtained. The user data 230 can include user preferences, user profile data, user relationships, the search history of the user, the browsing history of the user, the purchase history of the user, and/or other interaction data associated with the user. The user data 230 can be processed with an interest determination block 232 to determine a set of topics associated with the user. The set of topics can include topics determined to be of interest to the user, topics associated with a user's occupation, topics of interest to individuals associated with the user, topics associated with entities the user is a part of, and/or other topics identified as being relevant to the user. The interest determination block 232 can include one or more machine-learned models and/or may include one or more deterministic functions and/or thresholds. In some implementations, the change event 222 may be determined based on the output of the interest determination block, which can include adjusting a threshold for one or more topics and/or limiting the topics being reviewed for the change event determination.

Data descriptive of the change event 222 can be processed with a generative model 216 (e.g., a generative language model) to generate one or more query suggestions 224 (e.g., one or more example queries for selection) directed at surfacing search results related to the change event 222. The one or more query suggestions 224 may include detailed language directed at the particular aspect of the topic that has changed. The generative model 216 can include a machine-learned language model trained to generate natural language outputs, which can include one or more complete sentences that can be read as conversational language and tone. The one or more query suggestions 224 may be formatted as a question. In some implementations, the one or more query suggestions 224 may be in the tone, vocabulary, and/or style of the user by training the generative model 216 (and/or a soft prompt) on dialogue of the user.

One or more web resources 218 can be obtained based on data descriptive of the change event 222 and/or the one or more query suggestions 224. The one or more web resources 218 can include web pages, videos, images, audio files, documents, and/or other content items. The one or more web resources 218 can be top search results (e.g., top search results for the query of the query suggestion 224) and/or trusted content items from vetted databases (e.g., a scholarly article from an academic publication database). The one or more web resources 218 may be resources processed to determine the change event 222 and/or web resources determined to corroborate the existence of the update and/or the details of the change event 222.

In some implementations, the one or more web resources 218 can be processed with the generative model 216 to generate a change event summary 226 (e.g., one or more sentences that briefly identify one or more details associated with the update to the topic). The change event summary 226 can be descriptive of details of the change event 222 based on information in the one or more web resources 218. The change event summary 226 can be a plain language summary and may be formatted as an answer posed by a question of the one or more query suggestions 224.

The one or more query suggestions 224 and the one or more web resources 218 may be presented as a search suggestion 220 to the user. Alternatively and/or additionally, the one or more query suggestions 224 and the change event summary 226 may be provided as a search suggestion 220. The one or more suggestions 220 can be generated and provided before a search input is received and may be updated based on any input received from the user.

In some implementations, a plurality of query suggestions, a plurality of web resources, and/or a plurality of change event summaries can be generated and/or obtained to generate a plurality of query and content suggestions that can be provided in a newsfeed interface 228. The newsfeed interface 228 can display each query suggestion 224 with a respective web resource 218 and/or a respective change event summary 226. The displayed content can then be selected to perform a search on the query suggestion 224 to generate a search results interface, to redirect to the respective web resource 218, and/or to generate a model-generated article with the generative model 216 that describes the change event 222 in a longer and more comprehensive format than the change event summary 226.

In some implementations, the generative model 216 may perform the event determination. For example, the generative model 216 can process the web data 212 and generate a predicted query suggestion 224. The web data 212 can include data descriptive of popular and/or recent articles, social media posts, and/or other web data. The generative model 216 may process the headlines, URLs, and/or content items of recent and/or popular articles to predict a change event 222 (e.g., an update on a topic and/or a trend). The generative model 216 can then generate the query suggestion 224 based on the determined change event 222. In some implementations, the web data 212 can include data descriptive of previously viewed articles, social media profiles, domains, and/or web platforms associated with the user. The generative model 216 may process the data descriptive of previously viewed articles, social media profiles, domains, and/or web platforms associated with the user to generate a query suggestion 224 based on recent changes to previously viewed resources, based on predicting a query based on the previously viewed resources, and/or based on trends determined based on the previously viewed resources. In some implementations, the generative model 216 may perform the predictive query suggestion 224 generation based on the viewing order of the previously viewed resources.

Figure 3:
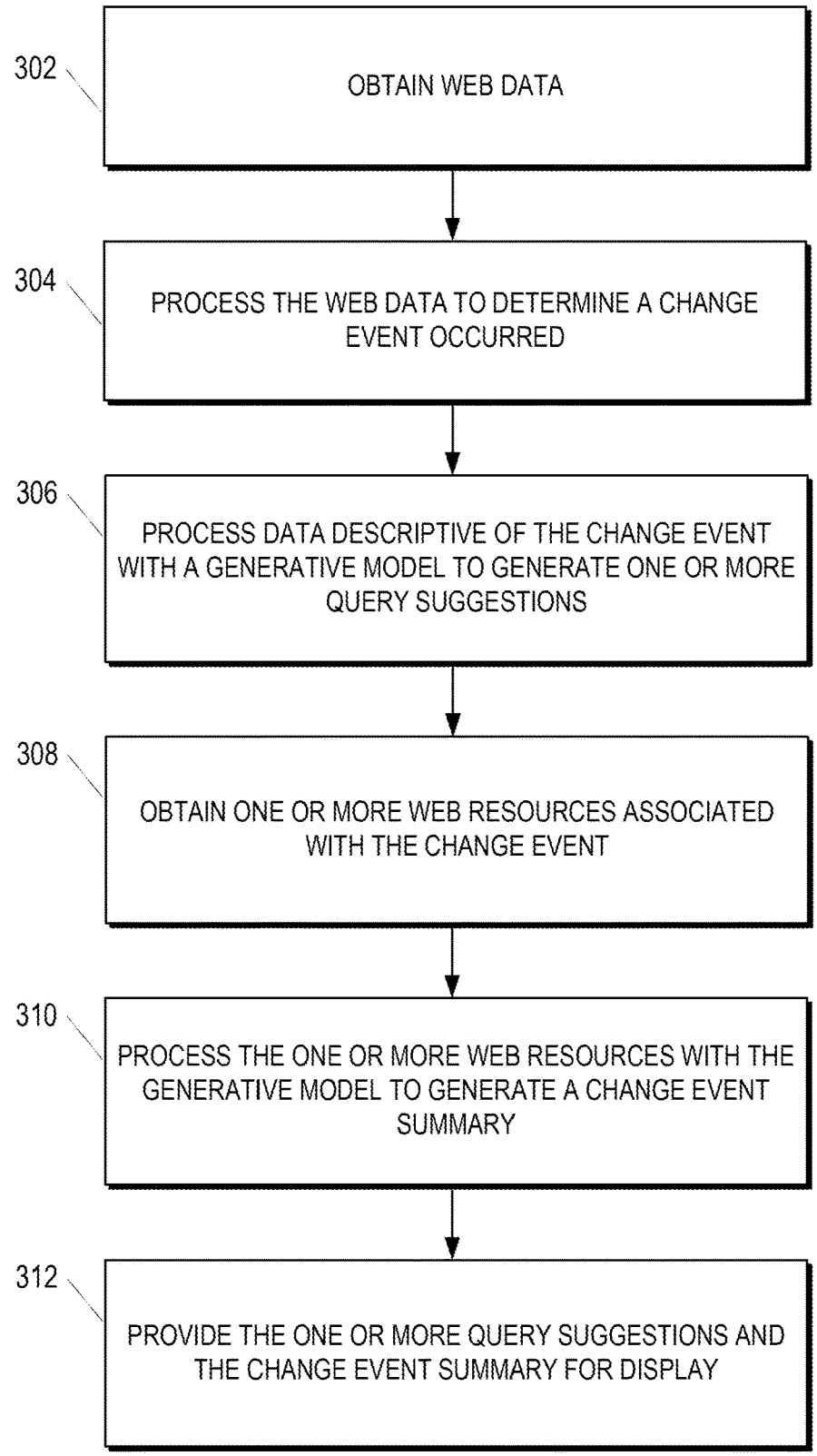
FIG. 3 depicts a flow chart diagram of an example method to perform query and content suggestion according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain web data. The web data can be descriptive of one or more topics. In some implementations, the web data can be obtained before a search query is received. The web data may be generated by obtaining and processing a plurality of content items. In some implementations, the web data can be descriptive of a plurality of queries obtained from a plurality of users. The web data can include data descriptive of a change in web traffic for one or more web pages, platforms, and/or domains.

At 304, the computing system can process the web data to determine a change event occurred. The change event can include an update associated with the one or more topics. The change event can be descriptive of an increased count of web traffic associated with the one or more topics. Alternatively and/or additionally, the change event can be descriptive of an increased count of global and/or localized search queries associated with the one or more topics. The change event may be determined based on one or more thresholds being met. The one or more thresholds may vary based on a level of generality for the respective topic (e.g., the threshold may be lower for more specific topics). Additionally and/or alternatively, the one or more thresholds may be determined based on a determined level of interest of a particular user with the respective topic (e.g., a higher level of determined interest may cause the one or more thresholds to be lower, which can cause a change event to be more likely to be determined for topics determined to be of high interest to the user). The interest level may be determined based on user data associated with the particular user. The user data can be associated with user preferences, a user search history, a user browsing history, a user's social media accounts, and/or other user-specific data. The one or more topics can be associated with one or more particular entities, one or more particular locations, one or more particular products, one or more particular individuals, and/or one or more other topics.

At 306, the computing system can process data descriptive of the change event with a generative model to generate one or more query suggestions. The generative model can include a large language model, a vision language model, an image-to-text model, and/or an image generation model. In some implementations, the data descriptive of the change event may be generated with (and/or processed by) one or more semantic understanding models, one or more detection models, one or more classification models, one or more segmentation models, one or more embedding models, and/or one or more augmentation models. The data descriptive of the change event may be descriptive of a topic classification and/or an identification of what has changed.

At 308, the computing system can obtain one or more web resources associated with the change event. The one or more web resources may be obtained by processing the one or more query suggestions with a search engine to determine one or more web resources responsive to the one or more queries associated with the one or more query suggestions. Alternatively and/or additionally, the one or more web resources may be obtained based on a determined topic associated with the change event.

At 310, the computing system can process the one or more web resources with the generative model to generate a change event summary. The change event summary can include a natural language summary of the update based on processing the one or more web resources. The update can be determined based on topic classification, semantic understanding, and/or other natural language processing techniques. In some implementations, the change event summary can include a model-generated summary provided with one or more citations associated with the one or more web resources.

At 312, the computing system can provide the one or more query suggestions and the change event summary for display. The one or more query suggestions and the change event summary can be provided for display before a search query is received. The one or more query suggestions and the change event summary may be provided for display in a search query suggestion interface that provides the pair in a panel adjacent to a search query input box.

In some implementations, the computing system can obtain user data associated with a user and determine the user is interested in one or more particular topics based on the user data. Processing the data descriptive of the change event with the generative model to generate the one or more query suggestions can be performed in response to determining the change event is associated with the one or more particular topics.

In some implementations, the computing system can determine a second change event occurred. The second change event can include an update associated with one or more second topics. The computing system can process data descriptive of the second change event with the generative model to generate one or more second query suggestions, obtain one or more second web resources associated with the second change event, and process the one or more second web resources with the generative model to generate a second change event summary. In some implementations, the computing system can provide the one or more second query suggestions and the second change event summary for display. The one or more query suggestions and the change event summary can be provided as a first pair. The one or more second query suggestions and the second change event summary can be provided as a second pair. The first pair and the second pair can be provided in a newsfeed interface.

In some implementations, the computing system can receive a selection of at least one of the one or more query suggestions or the change event summary and provide a search results interface for display. The search results interface can include a plurality of search results responsive to a search query associated with the one or more query suggestions. The plurality of search results can include the one or more web resources.

Alternatively and/or additionally, the computing system can receive a selection of at least one of the one or more query suggestions or the change event summary and provide a model-generated content item for display. The model-generated content item can be generated with the generative model. In some implementations, the model-generated content item can include information associated with the change event. The information can include details obtained from one or more databases formatted into a natural language article by the generative model.

Figure 4:
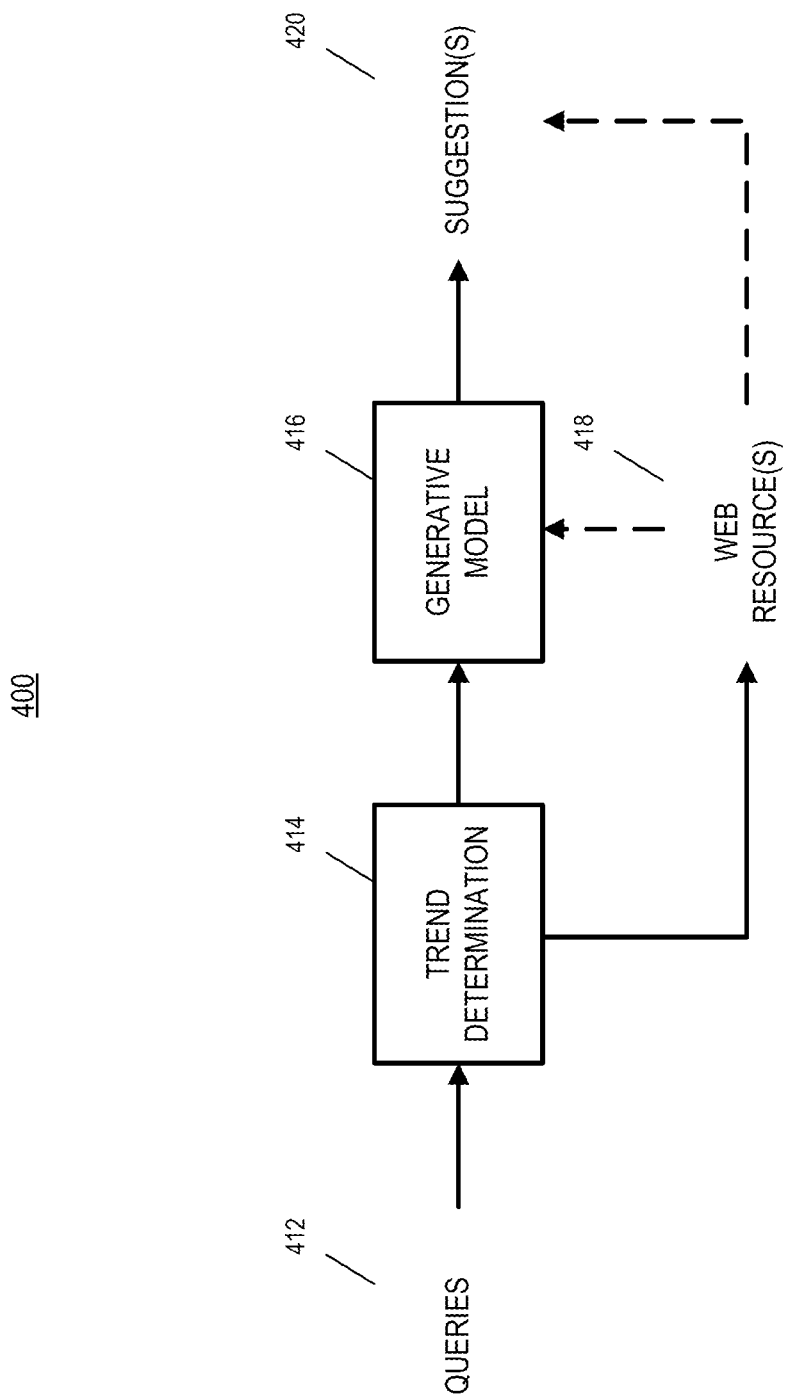
FIG. 4 depicts a block diagram of an example query trend determination system according to example embodiments of the present disclosure.

FIG. 4 depicts a block diagram of an example query trend determination system 400 according to example embodiments of the present disclosure. In particular, the query trend determination system 400 can perform proactive query and content suggestion based on processing a plurality of queries to determine a query trend that can then cause a generative model 416 to generate one or more query suggestions that may be provided with one or more web resources 418 and/or a content summary.

For example, a plurality of queries 412 can be obtained. The plurality of queries can be associated with a plurality of different users. The plurality of queries 412 may be recent queries within the past hour, day, week, and/or month. The plurality of different users may be global users, users local to the particular user, and/or other users determined to be associated with the particular user based on social media connections, interest, and/or other similarities.

The plurality of queries 412 can be processed with a trend determination block 414 to determine one or more query trends. The one or more query trends can be determined based on an influx in queries related to a particular topic and/or a particular group of topics. The determination may be based on one or more thresholds and/or based on one or more machine-learned models.

Data descriptive of the one or more query trends can be processed with a generative model 416 to generate one or more query suggestions associated with the topic of the query trend. The generative model 416 can include a language model trained to generate natural language queries. The one or more query suggestions can be formatted as questions and can be directed at the particular aspect of the topic that is the focal feature of the query trend.

Additionally and/or alternatively, one or more web resources 418 may be obtained based on the data descriptive of the query trend and/or the one or more query suggestions. The one or more web resources 418 may be associated with content items that were selected and/or viewed by a plurality of users when queries of the query trend were entered. Alternatively and/or additionally, the one or more web resources 418 may be proactively obtained search results for a query suggestion. In some implementations, the one or more web resources 418 may be obtained based on the determined query trend then processed with the generative model 416 to generate the one or more query suggestions.

The one or more web resources 418 may be processed with the generative model 416 to generate a content summary that is descriptive of the information described in the one or more web resources 418. The content summary can include a natural language summary that is descriptive of one or more shared details of content items responsive to the query suggestion. The content summary may be formatted as dialogue that responds to the prompt of the query suggestion.

The one or more query suggestions and the content summary may be provided for display to the particular user as a suggestion 420 for what to search. Alternatively and/or additionally, the one or more query suggestions and the one or more web resources may be provided for display to the particular user as a suggestion 420 for what to search.

In some implementations, the generative model 416 (e.g., a large language model) may process the plurality of queries 412 to generate the one or more query suggestions. For example, the generative model 416 can determine a query trend (e.g., an influx in a trend associated with a particular topic) and can generate a query suggestion based on the determined query trend. The query suggestion can be generated to be detailed, nuanced, and/or more intensive than the queries of the plurality of queries. In some implementations, the query suggestion may be generated to emulate a user vocabulary, user style, user tone, and/or user query length. The query suggestion may be generated to meet one or more query preferences (e.g., a length preference, a tone preference, a style preference, etc.).

In some implementations, the plurality of queries 412 can include a plurality of previously used queries for a particular user. The generative model 416 can process the plurality of queries 412 to generate an interesting, nuanced, fun, serious, objective, and/or other type of query suggestion. In particular, the predictive capabilities of the generative model can be utilized to predict a query that may be of interest to the particular user and can generate an interesting and nuanced query suggestion based on the prediction.

In some implementations, the generative model 416 may identify one or more representative queries of the plurality of queries that can be descriptive of the topic of the query trend. The generative model 416 can then rewrite the one or more representative queries to be more detailed and more indicative of the topic of the trend. Alternatively and/or additionally, the one or more representative queries can be rewritten to personalize the query suggestion for the particular user.

Figure 5:
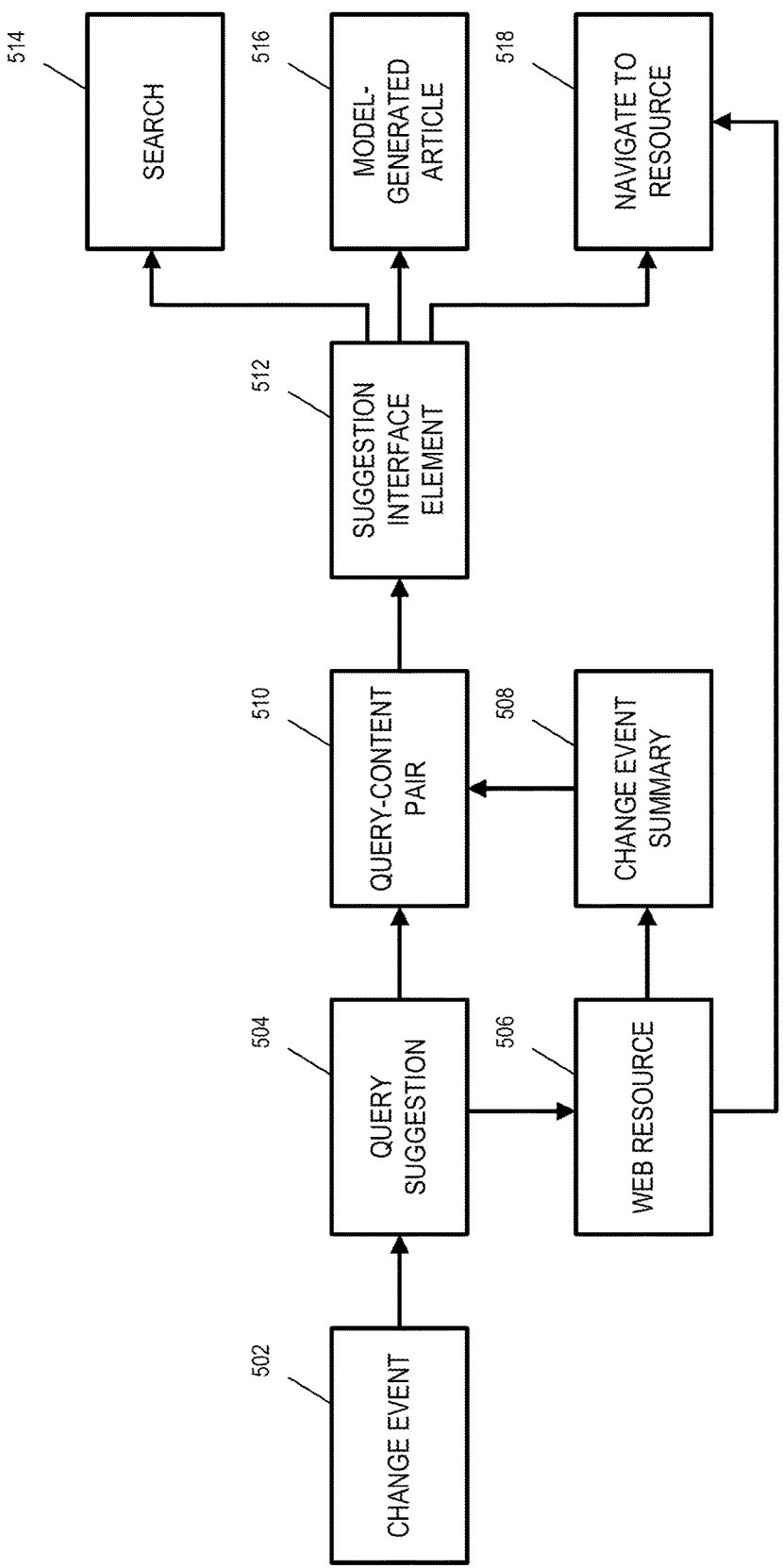
FIG. 5 depicts a block diagram of an example query newsfeed system according to example embodiments of the present disclosure.

FIG. 5 depicts a block diagram of an example query newsfeed system 500 according to example embodiments of the present disclosure. In particular, the query newsfeed system 500 can identify a query suggestion 504, a web resource 506, and/or a change event summary 508 for each change event 502 that can then be provided among other query suggestions in a newsfeed format.

For example, a change event 502 associated with one or more topics can be determined. The change event 502 can be associated with one or more changes to the one or more topics. Data descriptive of the change event 502 can be processed to generate a query suggestion 504. The query suggestion 504 can be processed with a search engine to determine one or more web resources 506 associated with the query suggestion 504. The one or more web resources 506 can include content items that include information on aspects of the one or more topics that have changed.

The one or more web resources 506 may be processed to generate a change event summary 508. The change event summary 508 can be based on one content item and/or a plurality of content items. In some implementations, a plurality of content items associated with the change event can be obtained and processed. Overlap between the plurality of content items can be determined, and the change event summary may be generated based on the determined overlap and/or the determined shared features.

The change event summary 508 and/or the one or more web resources 506 can be associated with the query suggestion 504 to generate a query-content pair 510. The query-content pair 510 can be processed to generate a suggestion interface element 512 that may include the query suggestion 504 and the change event summary 508 in a dialogue format (e.g., two individuals talking (e.g., question and answer)). The suggestion interface element 512 may be selectable to perform one or more operations.

For example, the suggestion interface element 512 can be selected to search 514 the query suggestion 504, generate a model-generated article 516, and/or navigate to a resource 518. The search 514 can be performed by processing the query suggestion 504 with a search engine to obtain and display a plurality of search results for the query. Generating the model-generated article 516 can include processing a plurality of web resources associated with the change event 502 with a generative model to generate an article that describes the change event 502 with details on what changed, an overview on the topic, and/or potential effects of the change. In some implementations, the suggestion interface element 512 can be selected to navigate to the one or more web resources 506 and/or provide the one or more web resources 506 in a viewing window.

Figure 6:
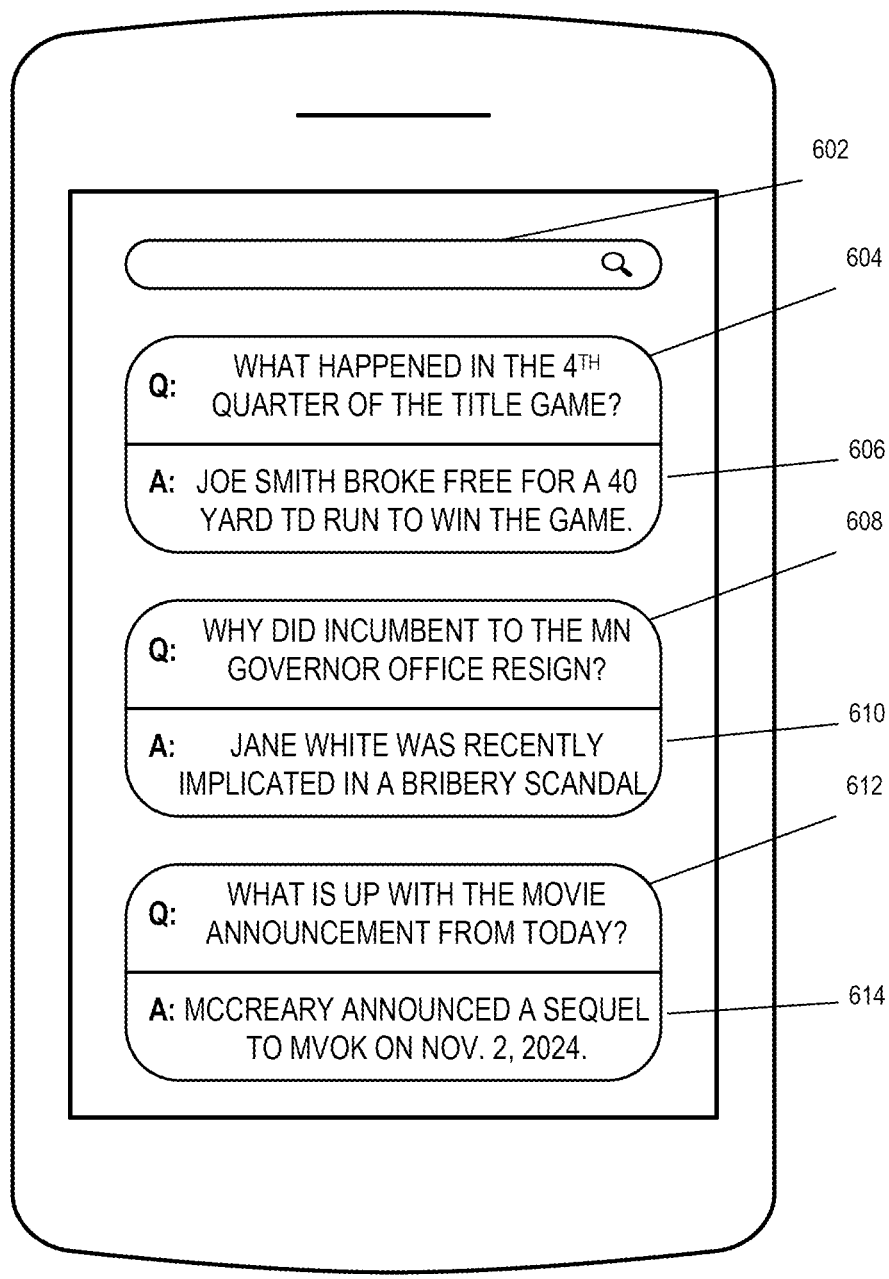
FIG. 6 depicts an illustration of an example newsfeed interface according to example embodiments of the present disclosure.

FIG. 6 depicts an illustration of an example newsfeed interface 600 according to example embodiments of the present disclosure. In particular, the newsfeed interface 600 can include a query input box 602, a plurality of query suggestions (e.g., 604, 608, and 612), and a plurality of respective change event summaries (e.g., 606, 610, and 614). The query input box 602 can be configured to receive search inputs (e.g., text queries, image queries, audio queries, and/or multimodal queries). The plurality of query suggestions (e.g., 604, 608, and 612) and the plurality of respective change event summaries (e.g., 606, 610, and 614) can be provided in a newsfeed format that displays the queries and summaries as pairs in a question and answer format. The plurality of query suggestions (e.g., 604, 608, and 612) and the plurality of respective change event summaries (e.g., 606, 610, and 614) can be generated in a tone, dialect, style, syntax, and/or terminology of the user being served the suggestions. The plurality of query suggestions (e.g., 604, 608, and 612) and the plurality of respective change event summaries (e.g., 606, 610, and 614) may be selectable to perform searches, obtain additional data, and/or generate content items.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a plurality of queries. The plurality of queries can be obtained from a plurality of users. The plurality of users may be global users and/or may be from a particular region. In some implementations, the computing system may determine the plurality of users are associated with a particular user that the computing system is determining suggestions for in the current instance. For example, a plurality of users with one or more shared attributes (e.g., shared interests, shared connections, shared schedules, shared activities, etc.) with the particular user may be determined. Search query data associated with each of the plurality of users may be periodically obtained and processed.

At 704, the computing system can process the plurality of queries to determine a query trend. The query trend can be descriptive of an increase in a quantity of queries associated with a particular topic. In some implementations, the query trend can be a global query trend. Alternatively and/or additionally, the query trend may be a regional trend, a localized trend, an age group-based trend, an occupation-based trend, and/or another sub-group trend.

At 706, the computing system can process data descriptive of the query trend with a language model to generate one or more query suggestions. The one or more query suggestions can be generated to be in a question format. For example, the computing system can determine a query trend associated with a potential trade acquisition between two football teams, and the language model can process data descriptive of the query trend to generate a query suggestion that includes "Who are the potential trade assets for the rumored trade between football team A and football team B?"

In some implementations, processing the data descriptive of the query trend with the language model to generate the one or more query suggestions can be performed in response to determining the particular topic is associated with one or more content items previously viewed by a particular user.

At 708, the computing system can obtain one or more web resources responsive to the one or more query suggestions. The one or more web resources may be obtained by processing the one or more query suggestions with a search engine. In some implementations, the one or more web resources may be one or more top search results for the given query associated with the query suggestion. Alternatively and/or additionally, the one or more web resources may include one or more content items obtained from one or more databases. The one or more databases may include one or more curated databases determined to include trusted and factual information. The one or more databases can be general knowledge databases and/or one or more specialized databases.

At 710, the computing system can process the one or more web resources with the language model to generate a content summary. The content summary can be descriptive of contents of the one or more web resources. In some implementations, the content summary can be generated to be in an answer format. The content summary can be generated to be responsive to a question of the one or more query suggestions. Additionally and/or alternatively, the content summary can include a natural language summary that includes one or more details obtained from the one or more web resources.

At 712, the computing system can provide the one or more query suggestions and the content summary for display. The one or more query suggestions and the content summary can be provided in a question and answer format. In some implementations, additional query suggestions and additional content summaries may be provided adjacent to the one or more query suggestions and the one or more content summaries. The one or more query suggestions may be selectable to navigate to a search results interface. Additionally and/or alternatively, the content summary may be selectable to obtain a long form model-generated article that includes additional details on the particular topic associated with the query trend.

Figure 8:
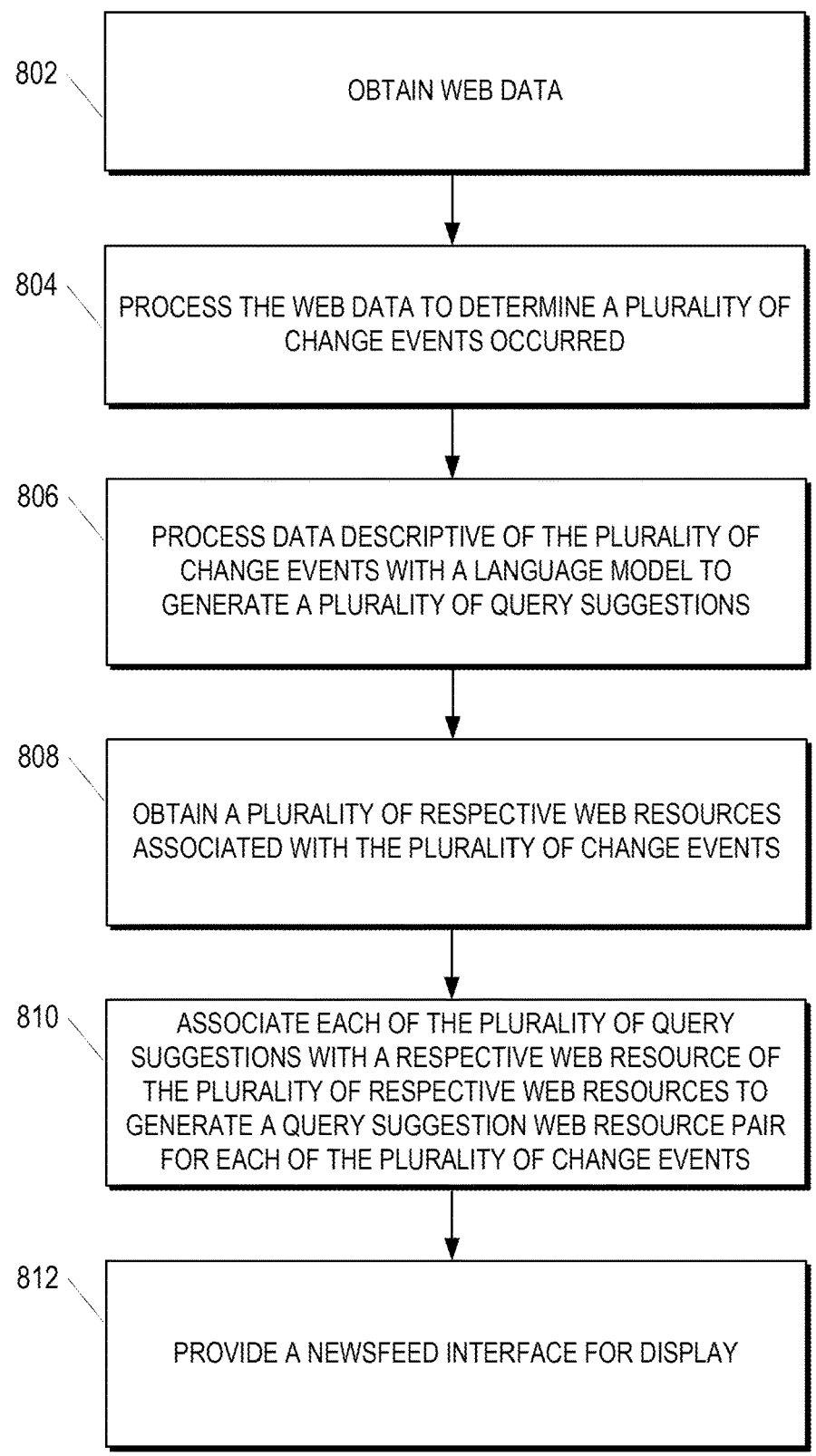
FIG. 8 depicts a flow chart diagram of an example method to perform query newsfeed generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain web data. The web data can be descriptive of content provided by a corpus of web resources. The web data can include data from one or more particular databases and/or may be obtained from a plurality of databases. The web data may be generated by crawling a plurality of web pages.

At 804, the computing system can process the web data to determine a plurality of change events occurred. The plurality of change events can include a plurality of updates associated with a plurality of topics. Each change event of the plurality of change events may be determined based on determining an influx in articles associated with a respective topic. Alternatively and/or additionally, each change event of the plurality of change events may be determined based on determining an influx in social media posts associated with a respective topic.

At 806, the computing system can process data descriptive of the plurality of change events with a language model to generate a plurality of query suggestions. The language model can include a generative model. Each query suggestion can be associated with a respective change event of the plurality of change events. The language model can include a machine-learned generative model trained to generate natural language data tailored to emulate a vocabulary, tone, and/or style of a particular user.

At 808, the computing system can obtain a plurality of respective web resources associated with the plurality of change events. The plurality of respective web resources can include one or more respective web resources for each of the plurality of change events. The plurality of respective web resources may be obtained by processing the plurality of query suggestions with a search engine. Alternatively and/or additionally, the plurality of respective web resources may be obtained by identifying content items associated with the respective change events based on data descriptive of the respective change events and/or the web data.

At 810, the computing system can associate each of the plurality of query suggestions with a respective web resource of the plurality of respective web resources to generate a query suggestion web resource pair for each of the plurality of change events. Associating the plurality of query suggestions with a respective web resource of the plurality of respective web resources to generate a query suggestion web resource pair for each of the plurality of change events can include generating a graphical user interface element for each of the query suggestion web resource pairs.

At 812, the computing system can provide a newsfeed interface for display. The newsfeed interface can include a set of query suggestion web resource pairs associated with at least a subset of the plurality of change events. The newsfeed interface can include one or more graphical user interface elements for each of the query suggestion web resource pairs. The graphical user interface elements can include a selectable query element, a selectable summary element, and/or a selectable web resource element. The selectable query element can be selected to navigate to a search result interface that displays search results for the respective query suggestion. The selectable summary element can be selected to generate and/or open a summarization interface that provides a change event summary associated with the respective change event. The selectable resource element can be selected to open a web page viewing interface that displays the respective web resource.

Figure 9:
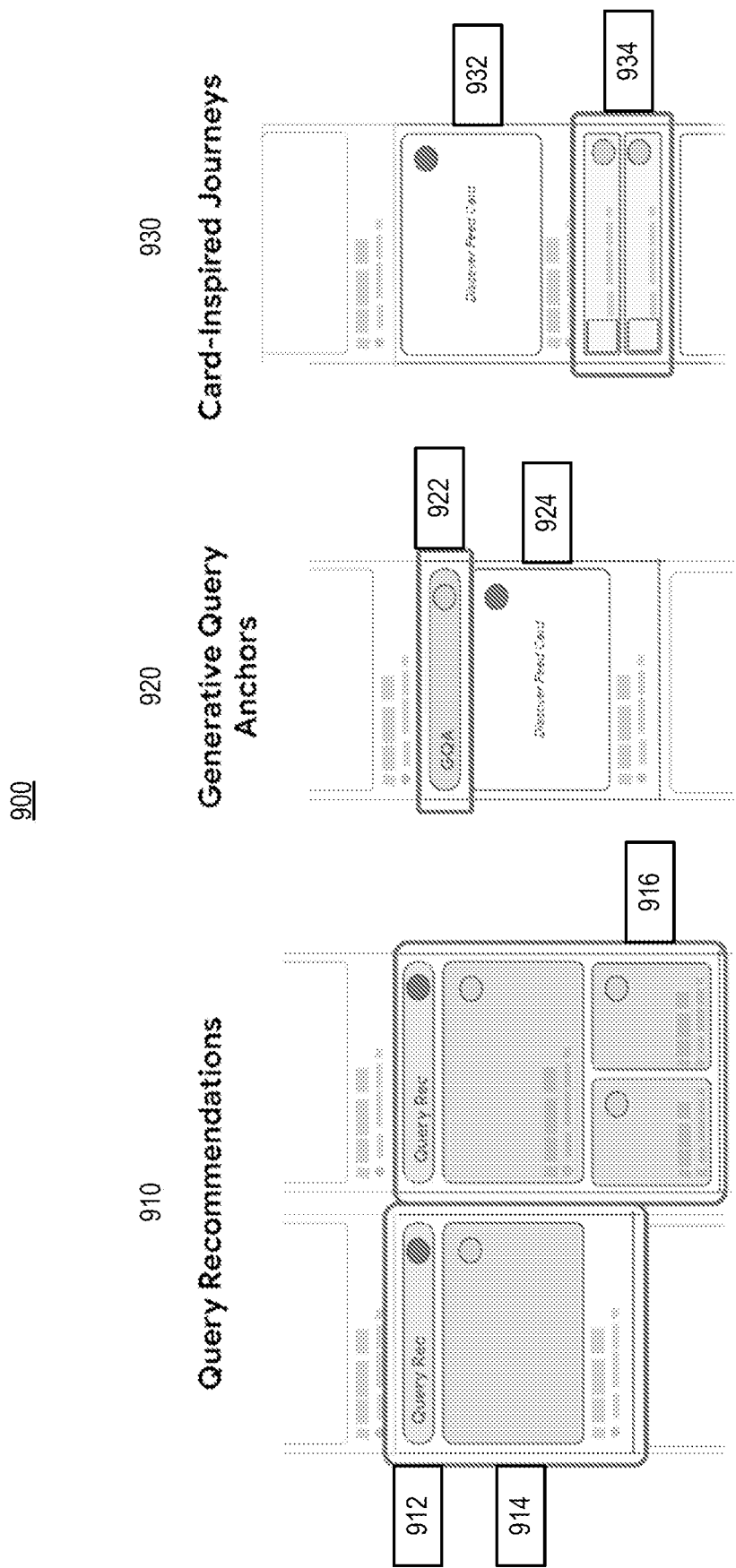
FIG. 9 depicts illustrations of example query suggestion interfaces according to example embodiments of the present disclosure.

FIG. 9 depicts illustrations of example query suggestion interfaces 900 according to example embodiments of the present disclosure. In particular, FIG. 9 depicts an example query recommendations interface 910, an example generative query anchors interface 920, and an example card-inspired journeys interface 930.

The query recommendations interface 910 can include one or more generated query suggestions 912 displayed with discover feed card 914 that can be associated with the respective query suggestion 912. For example, the discover feed card 914 can include a graphical card descriptive of a web resource associated with the query suggestion 912. Alternatively and/or additionally, the discover feed card 914 can include a model-generated summary that was generated to be responsive to the query based on processing one or more web resources. In some implementations, the query suggestion 912 and the discover feed card 914 may be provided with one or more additional graphical cards 916 associated with one or more additional web resources associated with the query suggestion 912. The query recommendations interface 910 can include a plurality of query suggestion 912 and discover feed card 914 pairs.

The generative query anchors interface 920 can provide a model-generated query suggestion 922 for display with a discover feed card 924 associated with the model-generated query suggestion. In some implementations, one or more web resources may be determined to be relevant to a user and/or a set of users. The one or more web resources can then be processed by a generative model to generate the model-generated query suggestion 922. Additionally, the discover feed card 924 can be generated to be descriptive of the one or more web resources and may include the headline, URL, and/or one or more content items from the one or more web resources. The query recommendations interface 910 can include a plurality of model-generated query suggestion 922 and discover feed card 924 pairs.

The card-inspired journeys interface 930 can include discover feed cards 932 provided for display with one or more action elements 934. For example, the discover feed card 932 may be associated with a query suggestion and/or may be generated based on a web resource identified without an initial query suggestion. The web resource(s) associated with the discover feed card 932 may be processed to determine a topic associated with the web resource(s), a content item type, and/or one or more other attributes of the web resource(s). Based on the topic, content type, and/or other attributes, one or more candidate actions can be determined to be associated with the web resource(s). The candidate actions can include follow-up queries, question and answer knowledge retrieval, application redirect, shopping, booking, mapping, etc. For example, the web resource(s) associated with the discover feed card 932 can be processed to generate a query directed at obtaining other web resources on a topic associated with the web resource(s) and/or obtaining additional information associated with a sub-topic mentioned in the web resource(s). In some implementations, the web resource(s) associated with the discover feed card 932 may be processed with a generative model to generate a set of model-generated questions and answers that are descriptive of information that can be learned from the web resource(s).

The candidate actions can then be utilized to generate the one or more action elements 934. For example, the query suggestion for obtaining additional information can be provided with the discover feed card 932 and may be selectable to perform the search. The model-generated questions and answers may be provided in a drop-down format such that the questions are initially displayed and the answers may be viewed by selecting the associated question. Each action element 934 may be selectable to perform a respective action (e.g., search, application redirect, model inference, informational display, etc.).

Figure 10A:
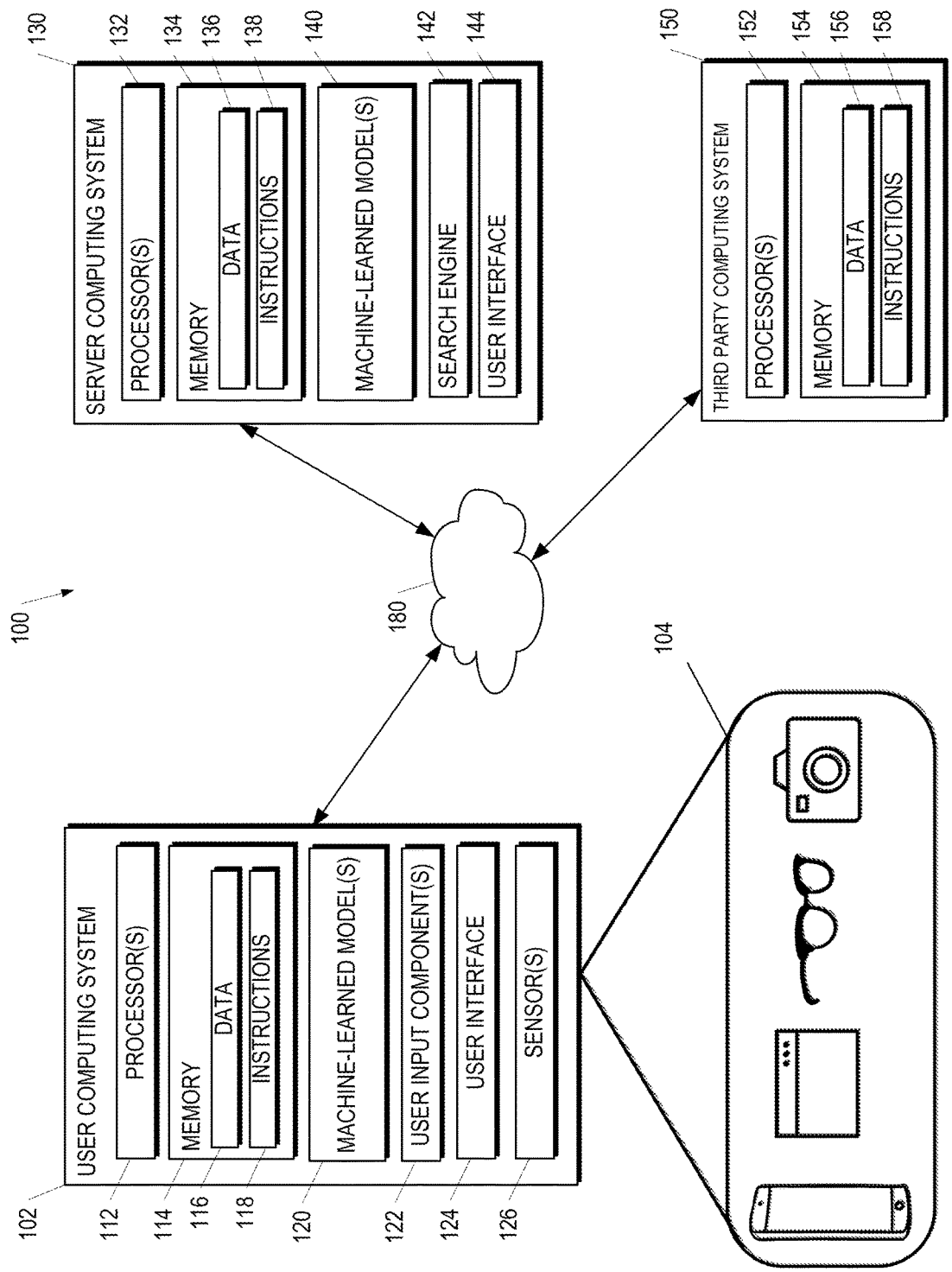
FIG. 10A depicts a block diagram of an example computing system that performs query and content suggestion according to example embodiments of the present disclosure.

FIG. 10A depicts a block diagram of an example computing system 100 that performs query and content suggestion according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. The machine-learned models 120 can include one or more generative models (e.g., a large language model, a text-to-image model, an image captioning model, etc.). The one or more generative models can include one or more transformer models and may include an autoregressive language model and/or an image diffusion model.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 140 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

In some implementations, the computing system 100 may utilize one or more soft prompts for conditioning the one or more machine-learned models (120 and/or 140) for downstream tasks. The one or more soft prompts can include a set of tunable parameters that can be trained (or tuned) as the parameters of the one or more machine-learned models (120 and/or 140) are fixed. The one or more soft prompts can be trained for a specific task and/or a specific set of tasks. Alternatively and/or additionally, the one or more soft prompts may be trained to condition the one or more machine-learned models (120 and/or 140) to perform inferences for a particular individual and/or one or more entities such that the output is tailored for that particular individual and/or particular entities. The one or more soft prompts can be obtained and processed with one or more inputs by the one or more machine-learned models (120 and/or 140).

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 10B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

A server computing system 130 (and/or a user computing system 102 via one or more entered preferences) may prompt the generative model for the particular query and content suggestion task (e.g., via few shot prompting, zero shot prompting, and/or via soft prompts). The prompting can include specifying a set number of queries, article data, post data, and/or historical data to obtain and process to perform model inference. In some implementations, prompting can include specifying "can you recommend some new questions that the user will find interesting?" Prompting can include requesting the generative model generate a "why." Prompting may include requesting user data be obtained and processed for user-specific tailoring of event determination and/or query generation.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 10B:
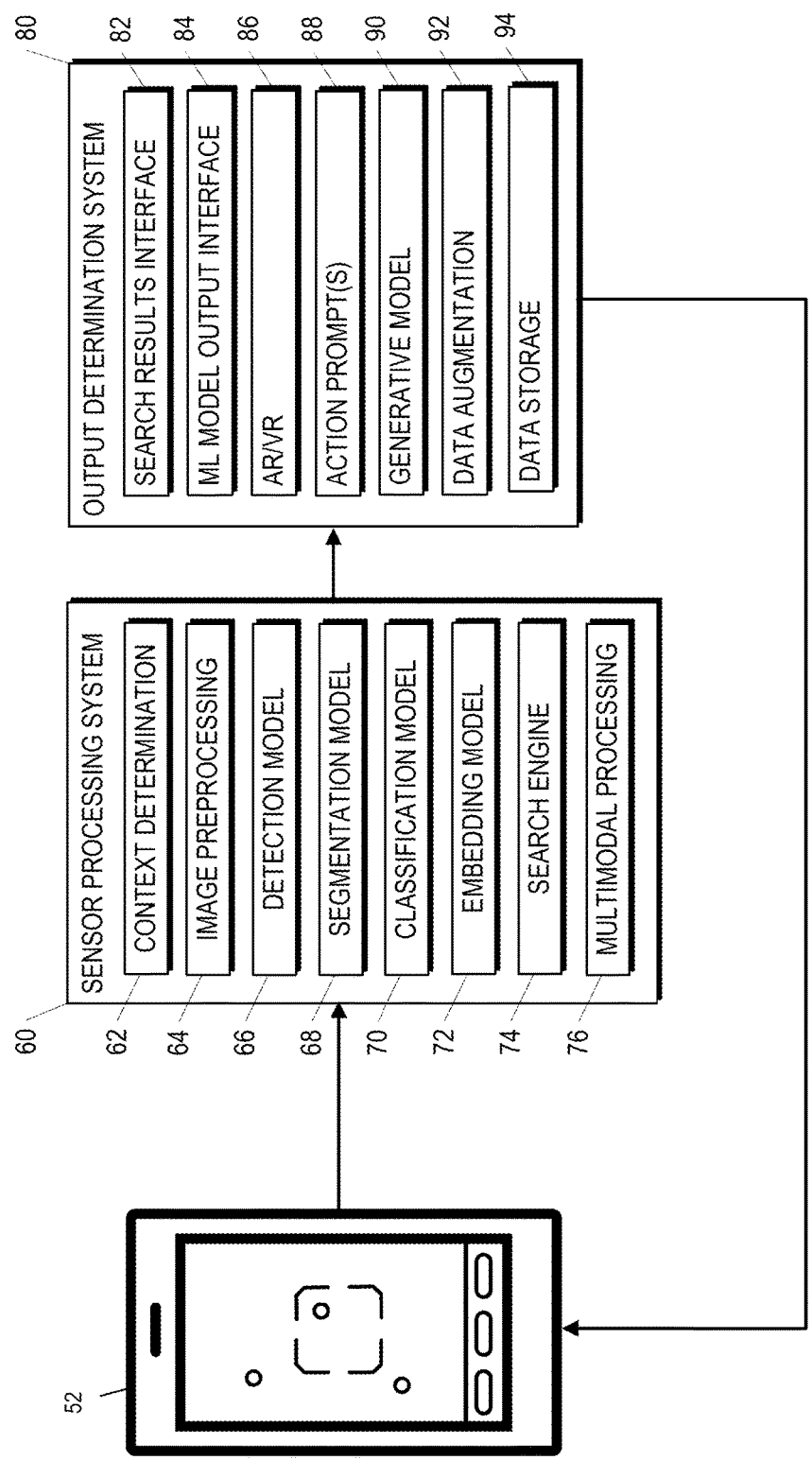
FIG. 10B depicts a block diagram of an example computing system that performs query and content suggestion according to example embodiments of the present disclosure.

FIG. 10B depicts a block diagram of an example computing system 50 that performs query and content suggestion according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results (and/or query suggestions) in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for proactive query and content suggestion, the method comprising:
    obtaining, by a computing system comprising one or more processors, web data, wherein the web data is descriptive of one or more topics;
    processing, by the computing system, the web data to determine a change event occurred, wherein the change event comprises an update associated with the one or more topics;
    processing, by the computing system, data descriptive of the change event with a generative model to generate one or more query suggestions;
    obtaining, by the computing system, one or more web resources associated with the change event;
    processing, by the computing system, the one or more web resources with the generative model to generate a change event summary;
    providing, by the computing system, the one or more query suggestions and the change event summary for display;
    receiving, by the computing system, a selection of at least one of the one or more query suggestions or the change event summary; and providing, by the computing system, a model-generated content item for display, wherein the model-generated content item is generated by the generative model, wherein the model-generated content item comprises information associated with the change event, and wherein the information comprises details obtained from one or more databases formatted into a natural language article by the generative model.

2. The method of claim 1, further comprising:
obtaining, by the computing system, user data associated with a user;
determining, by the computing system, the user is interested in one or more particular topics based on the user data; and
wherein processing, by the computing system, the data descriptive of the change event with the generative model to generate the one or more query suggestions is performed in response to:
determining, by the computing system, the change event is associated with the one or more particular topics.

3. The system of claim 1, further comprising:
determining, by the computing system, a second change event occurred, wherein the second change event comprises an update associated with one or more second topics;
processing, by the computing system, data descriptive of the second change event with the generative model to generate one or more second query suggestions;
obtaining, by the computing system, one or more second web resources associated with the second change event;
processing, by the computing system, the one or more second web resources with the generative model to generate a second change event summary; and
providing, by the computing system, the one or more second query suggestions and the second change event summary for display.

4. The system of claim 3, wherein the one or more query suggestions and the change event summary are provided as a first pair, wherein the one or more second query suggestions and the second change event summary are provided as a second pair, and wherein the first pair and the second pair are provided in a newsfeed interface.

5. The system of claim 1, further comprising:
in response to the selection, further providing, by the computing system, a search results interface for display, wherein the search results interface comprises a plurality of search results responsive to a search query associated with the one or more query suggestions.

6. The system of claim 5, wherein the plurality of search results comprise the one or more web resources.

7. The system of claim 1, wherein the web data is obtained before a search query is received.

8. The system of claim 7, wherein the one or more query suggestions and the change event summary are provided for display before a search query is received.

9. A computing system for proactive query and content suggestion, the system comprising:
one or more processors; and
one or more non-transitory computer-readable media that collectively store instructions that, when executed by the one or more processors, cause the computing system to perform operations, the operations comprising:
obtaining a plurality of queries, wherein the plurality of queries are obtained from a plurality of users;
processing the plurality of queries to determine a query trend, wherein the query trend is descriptive of an increase in a quantity of queries associated with a particular topic;
processing data descriptive of the query trend with a language model to generate one or more query suggestions;
obtaining one or more web resources responsive to the one or more query suggestions;
processing the one or more web resources with the language model to generate a content summary, wherein the content summary is descriptive of contents of the one or more web resources;
providing the one or more query suggestions and the content summary for display;
receiving a selection of at least one of the one or more query suggestions or the content summary; and
providing a model-generated content item for display, wherein the model-generated content item is generated by a generative model, wherein the model-generated content item comprises information associated with the particular topic associated with the query trend, and wherein the information comprises details obtained from one or more databases formatted into a natural language article by the generative model.

10. The system of claim 9, wherein the one or more query suggestions are generated to be in a question format.

11. The system of claim 10, wherein the content summary is generated to be in an answer format, and wherein the content summary is generated to be responsive to a question of the one or more query suggestions.

12. The system of claim 9, wherein the content summary comprises a natural language summary that comprises one or more details obtained from the one or more web resources.

13. The system of claim 9, wherein processing the data descriptive of the query trend with the language model to generate the one or more query suggestions is performed in response to:
determining the particular topic is associated with one or more content items previously viewed by a particular user.

14. The system of claim 9, wherein the query trend is a global query trend.

15. One or more non-transitory computer-readable media that collectively store instructions that, when executed by one or more computing devices, cause the one or more computing devices to perform operations, the operations comprising:
obtaining web data, wherein the web data is descriptive of content provided by a corpus of web resources;
processing the web data to determine a plurality of change events occurred, wherein the plurality of change events comprise a plurality of updates associated with a plurality of topics;
processing data descriptive of the plurality of change events with a language model to generate a plurality of query suggestions, wherein the language model comprises a generative model, and wherein each query suggestion is associated with a respective change event of the plurality of change events;
obtaining a plurality of respective web resources associated with the plurality of change events, wherein the plurality of respective web resources comprise one or more respective web resources for each of the plurality of change events;

associating each of the plurality of query suggestions with a respective web resource of the plurality of respective web resources to generate a query suggestion web resource pair for each of the plurality of change events; and providing a newsfeed interface for display, wherein the newsfeed interface comprises a set of query suggestion web resource pairs associated with at least a subset of the plurality of change events.

16. The one or more non-transitory computer-readable media of claim 15, wherein each change event of the plurality of change events are determined based on:
   determining an influx in articles associated with a respective topic.

17. The one or more non-transitory computer-readable media of claim 15, wherein each change event of the plurality of change events are determined based on:
   determining an influx in social media posts associated with a respective topic.

18. The one or more non-transitory computer-readable media of claim 15, wherein the language model comprises a machine-learned generative model trained to generate natural language data tailored to emulate a vocabulary, tone, and style of a particular user.

* * * * *